Figure 5:
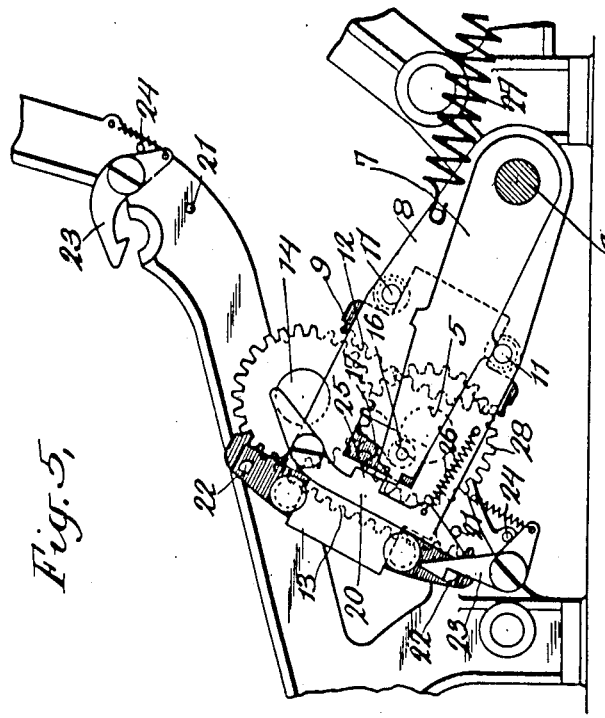

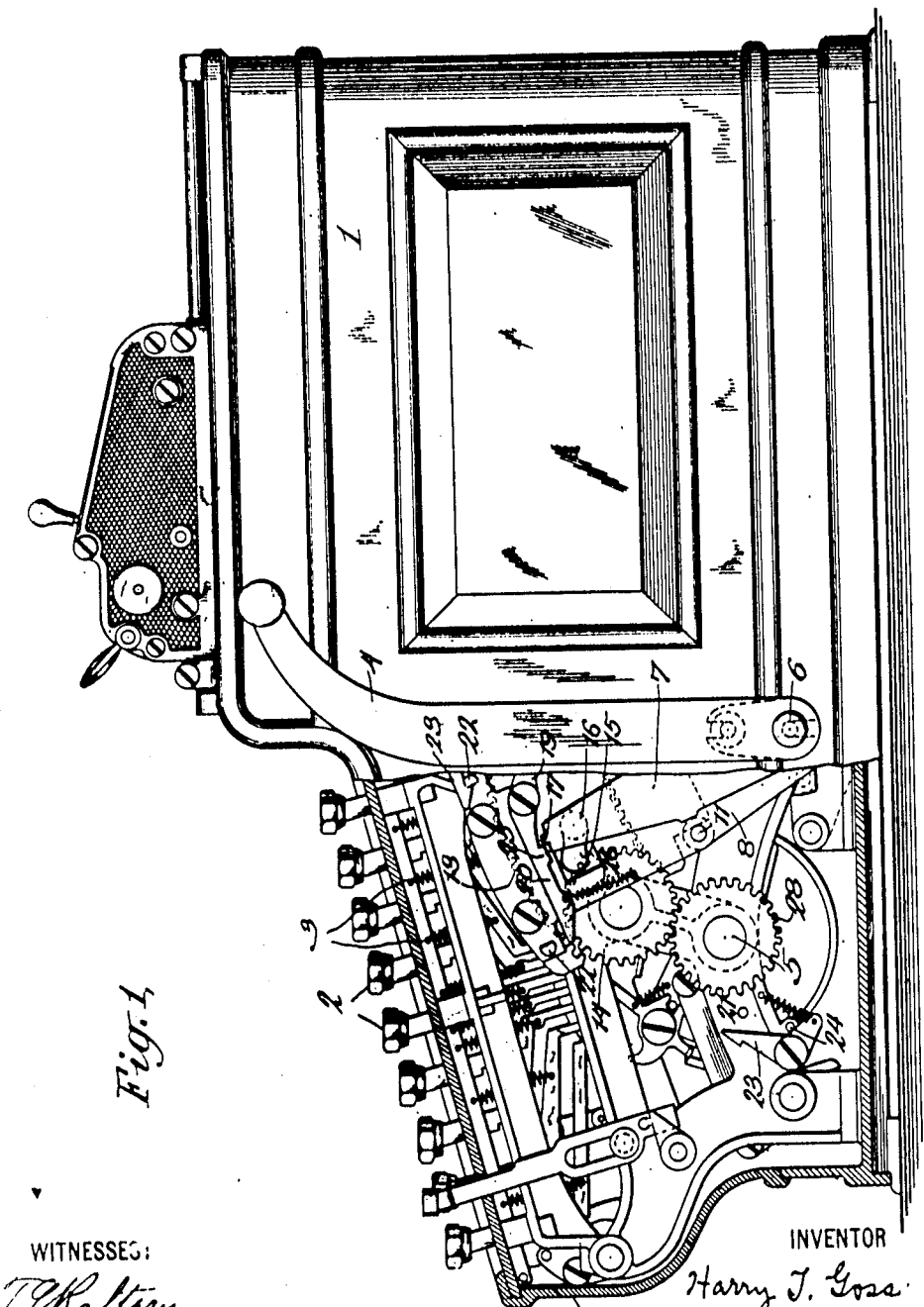

No. 831,057. PATENTED SEPT. 18, 1906.
H. T. GOSS.
DRIVING MECHANISM FOR NUMBER INDICATING MACHINES.
APPLICATION FILED FEB. 2, 1905.
4 SHEETS—SHEET 2.
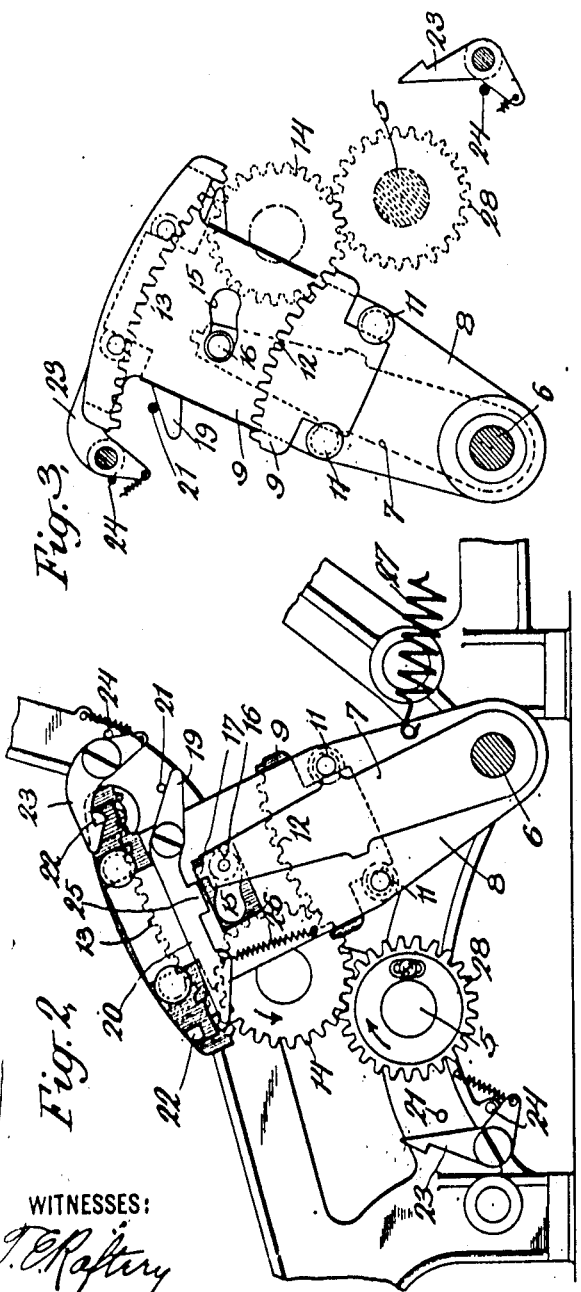
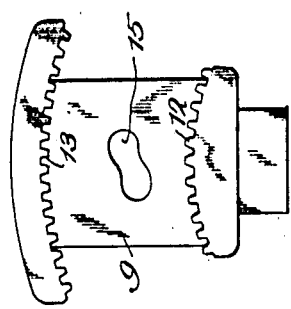
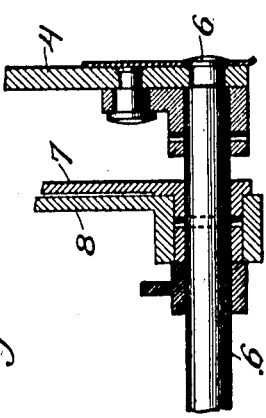
WITNESSES:
INVENTOR
Harry T. Goss
BY
Kenyon & Kenyon
ATTORNEYS No. 831,057. PATENTED SEPT. 18, 1906.
H. T. GOSS.
DRIVING MECHANISM FOR NUMBER INDICATING MACHINES.
APPLICATION FILED FEB. 2, 1905.

4 SHEETS—SHEET 3.

WITNESSES:
T. R. Raftery
John O. Gempler

INVENTOR
Harry T. Goss
BY
Kenyon & Kenyon
ATTORNEYS

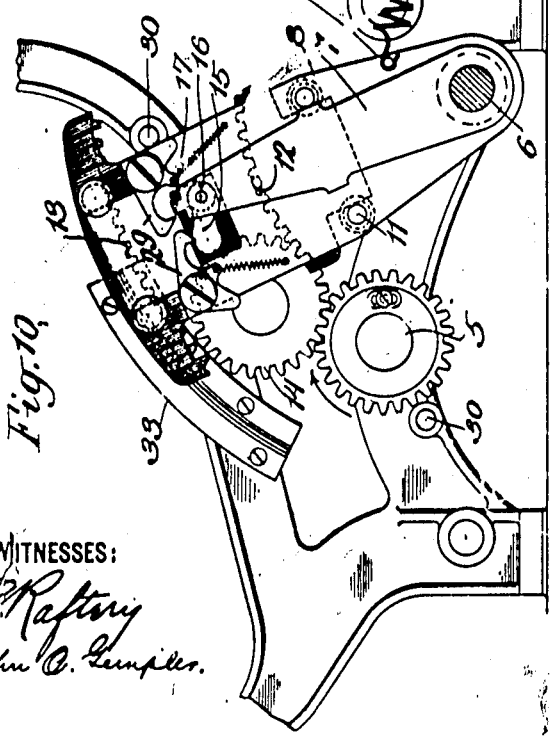

UNITED STATES PATENT OFFICE.

HARRY T. GOSS, OF RUTHERFORD, NEW JERSEY, ASSIGNOR TO BUNDY MANUFACTURING COMPANY, A CORPORATION OF NEW YORK.

DRIVING MECHANISM FOR NUMBER-INDICATING MACHINES.

No. 831,057.  Specification of Letters Patent.  Patented Sept. 18, 1906.

Application filed February 2, 1905. Serial No. 243,886.

*To all whom it may concern:*

Be it known that I, HARRY T. GOSS, a citizen of the United States, and a resident of Rutherford, county of Bergen, State of New Jersey, have invented a new and useful Improvement in Driving Mechanism for Number-Indicating Machines, of which the following is a specification.

My invention relates to driving mechanism for number-indicating machines.

It is shown in the accompanying drawings as embodied in an adding-machine where numbers corresponding to the values of keys depressed are set up and printed and are added upon adding-wheels. It is, however, not limited to use in connection with such machines, although peculiarly applicable thereto.

The object of my invention is to provide means for enabling number-indicating machines to be operated by a rocking or reciprocating handle or member, in which machines nevertheless the main driving-shaft or driving member will be driven in one direction only; also, for causing the motion of the driving member due to the motion of the reciprocating member in one direction to differ in amount from its motion due to the motion of the reciprocating member in the other direction, and preferably to cause the initial movement of the handle to rotate the driving-shaft a greater distance than it will be driven on the return movement of the handle; also, to provide means for positively locking the moving parts together during their respective movements to insure accuracy and certainty of operation.

In the drawings accompanying this specification and forming part hereof I have shown one form or embodiment of my invention. As there embodied it is used in connection with the driving mechanism of a printing and adding machine in which keys representing different values are employed, the depression of which keys brings corresponding type upon a line for printing or adding purposes. The use of my invention is not, however, confined to such machines.

Figure 9:
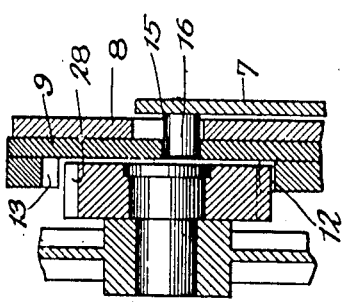
Figure 4:
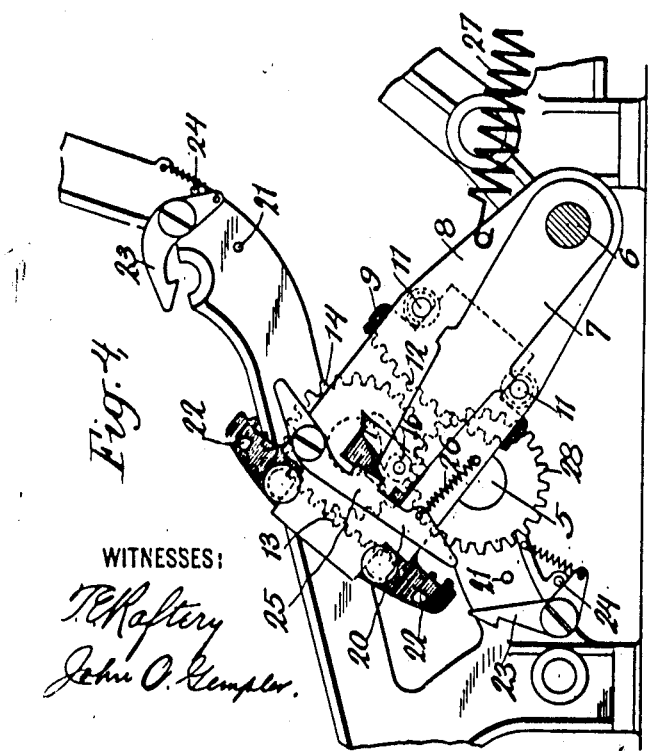
Figure 8:
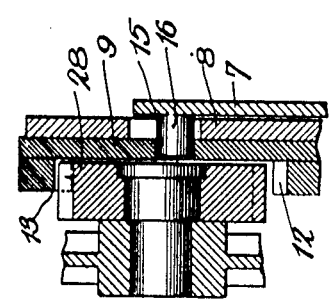

Referring now to the specific for[m] in[...]

side. Fig. 4 is a view similar to Fig. 2 with the parts in a different position. Fig. 5 is still another similar view with the parts in the extreme opposite position from that shown in Fig. 2. Fig. 6 is a detail of the fastenings of the driving mechanism to the main operating-shaft. Fig. 7 is a view of the sliding plate with its internal and external gear. Figs. 8 and 9 are views of the driving members in two different positions, Fig. 8 being the position of the parts when the handle is being pulled forward, and Fig. 9 the position of the same parts when the handle is in its reverse position. Fig. 10 is a side elevation of a modification. Fig. 11 is a view looking in the opposite direction from Fig. 10. Fig. 12 is a view showing the operating parts of Fig. 10 in the positions they assume when the handle is being pulled forward, and Fig. 13 is the position of these parts when the handle is in its reverse movement.

1 represents the casing of the adding-machine containing my improved driving mechanism. 2 represents the keys, which are of the usual character, normally held in their upward position by springs 33, secured to the shanks of the keys and to the framework of the machine. 4 is an operating-handle. The machine is operated by depressing the desired keys, and then the operating-handle 4 is pulled forward by the operator and then pushed backward or returned to its backward position by any suitable means. T.is operation of the machine sets up type corresponding to the keys depressed upon a printing-line and adds such numbers to the total adding-wheels. None of these parts except the main driving mechanism of the machine, which will be presently described, form[s] [a] part of my invention, and such parts [are] not shown and will not be described. T[hey] may be of any suitable construction.

Referring now to the form of my impro[ved] driving mechanism shown in the drawin[gs] provide a driving member adapted to ro[tate] in one direction only and which i[...]

continuous rotation of the other. These connections are so arranged and shaped that the movement of the handle 4 in one direction will cause the main driving-shaft 5 to be rotated a different distance from that imparted to it by the movement of the handle in the opposite direction. I prefer to arrange the parts so that the forward or initial movement of the handle 4 will cause shaft 5 to rotate a greater distance than it will be rotated by the return of handle 4 to its original position. In the form shown in the drawings the forward movement of handle 4 rotates shaft 5 two-thirds of a complete revolution, while the backward or return movement of the handle will rotate the shaft the remaining one-third. The connections shown for the purpose are as follows: 7 is a plate fast to shaft 6. 8 is a plate loosely mounted on the shaft. Slidingly mounted on plate 8 is a slide-plate 9, having an extension 10, movable between studs 11 of plate 8. Sliding plate 9 is capable of a sliding movement on plate 8. This sliding plate is provided with two reversely-acting sets of gearing 12 and 13. These sets of gearing are arranged at different radial distances from the center of rock-shaft 6 and when operative concentric therewith one gearing, 12, facing outward from the center, the other, 13, facing inward. These gears 12 and 13 are so arranged that if sliding plate 9 is in its outward radial position gearing 12 will mesh with gear-wheel 14 and gearing 13 will be out of mesh, while if the sliding plate is in its inward radial position gearing 13 will mesh with the opposite side of gear-wheel 14 and gearing 12 will be out of mesh. Means are provided for throwing one of these sets of gears into mesh with gear-wheel 14 when rock-shaft 6 rotates one way and the other into mesh with it when the shaft rotates the other way. In sliding plate 9 is a cam-slot 15, in which works a roller 16, attached to plate 7. The upper part of plate 7 has a tooth 17. Mounted on plate 8 is a pawl 18, which has an extension 19 at the right and an extension 20 at the left. The cam-surfaces on these extensions are adapted in the different positions of the parts to pins 21, mounted on the side frame of machine. Mounted on plate 8 are two and 22, and coacting with these pins, ounted on the side frame of the machine are two pawls 23, which are springed and have limiting stops 24, 24. has a tooth 25 coacting with tooth operatio of de the po rm with gear-wheel 14, while gearing 13 is out of mesh. The forward movement of handle 4 will cause plate 7 to begin to move to the left as viewed in Fig. 2 and will carry roller 16 to the left-hand end of slot 15. The shape and slope of this cam-slot is such that this first movement of the parts will move sliding plate 10 inwardly, taking gearing 12 out of mesh with gear-wheel 14 and throwing gearing 13 into mesh with it on its opposite side. A slight further movement of the handle will free extension 19 from pin 21, and spring 26 will pull pawl 20 downward, bringing tooth 25 in line with tooth 17. Plate 7 and its tooth 17 will, however, by this time have moved far enough to the left so that tooth 25 will drop back of tooth 17. At this moment roller 16 will have reached the forward or left-hand end of slot 15. In this position of the parts, with roller 16 at the left of slot 15 and tooth 25 immediately back of tooth 17, plates 7 and 8 will be rigidly locked together, so that the forward movement of plate 7 will carry with it plate 8 and all of its parts the same as if they formed parts of one rigid structure. This rigidity is one of the important features of my improvement, and it is essential for the accurate and reliable working of a rapid adding or printing machine. Further forward movement of the handle will cause gear-wheel 14 to rotate in the direction of the arrow, rotating main driving-shaft 5 in the direction of the arrow. When handle 4 has reached its forward position, pin 23 locks into pawl 22, locking plate 8 and its connections temporarily in their down or forward position. Pin 21 will strike the forward end of pawl 20 and will throw tooth 25 out from behind tooth 17, permitting tooth 17 and its plate 7, to make their return movement. When handle 4 begins its backward movement, plate 7, being free from plate 8, moves roller 16 toward the opposite or rear end of slot 15, moving sliding plate rapidly outward, throwing gearing 13 out of mesh and gearing 12 into mesh with gear 14, and freeing pin 22 from pawl 23, permitting the return movement of plate 8 and its connections.

Fig. 4 illustrates the position of the parts when midway on their forward movement and Fig. 5 when they have reached the extreme forward position. When the return movement has proceeded a short distance, pawl 25 becomes disengaged from pin 21 and tooth 25 drops backward. By this time tooth 17 has moved sufficiently to the rear to oth 25 to drop immediately in front 17. Plates 7 and 8 are agai igidly tooth 25 of 25

The purpose of this spring is to return the parts to their original or normal positions in case the operator lets go of the handle while on its return or does not push it far enough back. Spring 27 is so proportioned that it will bring the parts back to their original positions in such case. As the parts reach their original positions pawl 23 again locks with pin 22, locking plate 8 and its connections in their original positions, and extension 19 of pawl 20 strikes against pin 21, leaving tooth 25 out of engagement with tooth 17, preparing the parts for the next operation of the machine. The reversely-acting gears, facing in opposite directions and operating upon different sides of the gear-wheel 14 when successively in engagement with it, rotate that gear, and with it the main driving-shaft, always in the same direction. The arrangement of these gearings 12 and 13 at different distances from the center of the rock-shaft enables the main driving-shaft to be rotated a greater distance when handle 4 is moved in one direction than when it is moved in the other. As shown, these parts are so proportioned and arranged that on the forward or initial movement of handle 4 shaft 5 is rotated two-thirds of a complete revolution and on the return of the handle it is rotated the remaining one-third of a revolution. One advantage of this arrangement is that practically the entire work performed by the machine is accomplished on the forward pull of handle 4. Substantially no work need be performed on the return of the handle, except to return to their original positions a few of the parts of the machine and that, too, when running free. By means of my improved arrangement the return-spring 27 can be made comparatively very light. Where this spring is made strong, as it must be where a considerable part of the work is done on the return of the handle, the amount of work to be done by the operator in operating the machine is very largely increased. In practice it has been found that the ordinary operator will not push the reciprocating handle backward at least to its full limit or at least with the force with which he will pull it forward and that most operators will let go of the handle at some point during the return. For these reasons a return-spring is essential for practical use. By means of my improved arrangement a continuous rotary movement can be imparted to the main driving-shaft of the machine, while the operating-handle may have a reciprocating movement. This is of great advantage as it has been found in practice that machines of the character shown in the drawings are more easily operated by means of a reciprocating handle than by means of one making a complete revolution. By means of my improvement such machines can be made very rapid, accurate, and positive in operation. In order that gear 12 may pass in front of gear 28 on shaft 5, gear 14 is made of double width, so that gears 12 and 13 may mesh with the front half of it, while gear 28 meshes with the rear half.

Figs. 10 to 13, inclusive, show a modification of the means for locking the plates 7 and 8 together. Instead of the pawl 20 and its tooth 25 and extensions and pins 21 I provide two spring-actuated pawls 29, pivoted to plate 8, and two pins 30 on the framework, against which they strike on the extreme limit of movement of the parts. Normally pin 30 holds right-hand pawl 29 out of engagement with tooth 17. On the further movement of the parts to the left roller 16 moves to the left-hand slot 15 and rides under and past the point of the left-hand pawl 29. It is there held between the extreme left-hand end of slot 15 and pawl 29, and thus locks plates 7 and 8 rigidly together. Tooth 17 is disengaged from its pawl when the latter strikes pin 30 at the extreme limit of the forward movement of the parts, whereupon pin 16 moves to the other end of slot and engages with the other pawl 29, thus locking plates 7 and 8 rigidly together for the return movement. In these figures I have shown a further means for preventing sliding plate 9 from moving rapidly inward or outward during the forward or backward movement of the parts. As there shown, sliding plate 9 is provided with a tooth 31, and 32 is a fixed flange or rail on a plate 33, secured to the framework. This flange or rail is concentric with shaft 6. On the forward or initial movement of the parts when plate 9 is in its inward position tooth 31 runs on the inner side of flange 32; but on the return movement of the parts, when sliding plate 9 is in its outward position tooth 31 runs on the outward or upper side of flange 32, thus effectually preventing any radial movement of the sliding plate during either movement.

By my improved devices a number-indicating machine may be operated by means of a reciprocating handle and yet the advantages of continuous rotation of the main driving shaft or member be retained. The machine is more easily operated than where a rotating crank-handle is employed. There is less wear and tear on the machine than where the driving and operating parts reciprocate movement, and it is more rapid in operation and more accurate and reliable than such machines. These advantages are attained without sacrificing the rigidity essential in such parts to rapid, accurate, and certain operation. These are very great advantages in machines of the character of the one shown in part in the drawings, which machine is very rapid in its operation.

By my improvement the greater part of the work of the machine can be done by one movement of the reciprocating handle, preferably the initial or forward one. This enables a spring of less power to be employed for the return of the handle, and as a consequence considerable less power is required to operate the machine.

My improvement has been devised in connection with the construction of the adding-machine shown in part in the drawings, the rest of which machine is not an invention of mine. My invention, however, is not limited in its use in connection with such machines. Many modifications and changes in the form of devices shown in the drawings may be made without departing from my invention.

What I claim as new, and desire to secure by Letters Patent, is—

1. The combination of a driving member adapted to rotate in one direction only, a reciprocating member for imparting motion to the driving member, and connections between the two members for causing the reciprocating motion of the reciprocating member to impart to the driving member a motion in one direction only so arranged and adapted that the motion of the driving member, due to the motion of the reciprocating member in one direction, will differ in amount from its motion due to the motion of the reciprocating member in the other direction.

2. The combination of a driving-shaft adapted to rotate in one direction only, a rock-shaft for imparting motion to the driving-shaft, a reciprocating handle mounted in connection with the rock-shaft, and connections between the two shafts for causing the rock-shaft to rotate the driving-shaft in one direction only when the handle is reciprocated, all so arranged and adapted that the movement of the handle in one direction will impart to the driving-shaft a different amount of rotation from that imparted to it by the movement of the handle in the opposite direction.

3. The combination of a driving-shaft adapted to rotate in one direction only, a rock-shaft for imparting motion to the driving-shaft, a reciprocating handle mounted in connection with the rock-shaft, and connections between the two shafts for causing the rock-shaft to rotate the driving-shaft in one direction only when the handle is reciprocated, all so arranged and adapted that the initial movement of the handle will rotate the driving-shaft a greater distance than will the return movement of the handle.

4. The combination of a driving-shaft adapted to rotate in one direction only, a rock-shaft for imparting motion to the driving-shaft, a part fast to said rock-shaft, a gear-bearing member loose upon said rock-shaft, two sets of gearing mounted upon said member, locking means for connecting the fast part and loose member together to impart a reciprocating movement to the loose part and for disconnecting them, and means for moving the sets of gearing radially for alternately operatively connecting first one then the other of said sets of gearing with the driving-shaft as the rock-shaft reciprocates, whereby the driving-shaft will always be rotated in the same direction.

5. The combination of a driving-shaft adapted to rotate in one direction only, a rock-shaft for imparting motion to the driving-shaft, a part fast to said rock-shaft, a gear-bearing member loose upon said rock-shaft, two sets of gearing mounted upon said member, and arranged at different distances from the center of the rock-shaft, locking means for connecting the fast part and loose member together to impart a reciprocating movement to the loose part and for disconnecting them, and means for moving the sets of gearing radially for alternately operatively connecting first one then the other of said sets of gearing with opposite sides of a gear connected with the driving-shaft as the rock-shaft reciprocates, whereby the driving-shaft will always be rotated in the same direction and will be rotated farther by the movement of the rock-shaft in one direction than by the movement of the rock-shaft in the other direction.

6. The combination of a driving-shaft adapted to rotate in one direction only, a rock-shaft for imparting motion to the driving-shaft, and connections between the two shafts for causing the rock-shaft to rotate the driving-shaft in one direction only, said connections including two gears mounted concentrically with the rock-shaft when in operative position but at different radial distances therefrom, means for moving said gears radially of the rock-shaft to bring one or the other of said gears into mesh with a gear connected with the driving-shaft but upon opposite sides of said gear, whereby the driving-shaft will always be rotated in the same direction and will be rotated farther by the movement of the rock-shaft in one direction than by the movement of the rock-shaft in the other direction.

7. The combination of a driving-shaft adapted to rotate in one direction only, a rock-shaft for imparting motion to the driving-shaft, and connections between the two shafts for causing the rock-shaft to rotate the driving-shaft in one direction only, said connections including two gears mounted concentrically with the rock-shaft when in operative position but at different radial distances therefrom, whereby the rock-shaft will, by its movement in one direction, rotate the driving-shaft farther than it will rotate it by its movement in the other direction.

8. The combination of a driving-shaft adapted to rotate in one direction only, a rock-shaft for imparting motion to the driving-shaft, and connections between the two shafts arranged and adapted to positively lock them together during the movement of the rock-shaft in one direction to rotate the driving-shaft one way and to unlock them at the close of such movement, and to positively lock them together again during the return movement of the rock-shaft in such manner as to continue the rotation of the driving-shaft in the same direction as it rotated during the initial movement of the rock-shaft.

9. The combination of a rock-shaft, a reciprocating handle for rocking said shaft, a driving-shaft, gearing connected therewith, a part fast upon the rock-shaft, a part loose on said rock-shaft, a sliding plate mounted on said loose part and having radial play thereon, two sets of gears on the sliding plate arranged at different radial distances from the center of the rock-shaft and adapted when in operative position to mesh with opposite sides of the driving-shaft gearing, catches for holding the loose part and its sliding plate in their extreme positions, means for causing the fast part in its movement in either direction to move the sliding plate radially and thus unlock its catch, and throw one of its gears into mesh and the other out of mesh with the driving-shaft gearing, and then to move the loose part and its sliding plate to their other extreme, whereby a complete reciprocating movement of the handle will cause a complete rotation of the driving-shaft in the same direction, and the driving-shaft will be rotated farther during the initial movement of the handle than during its return movement.

In testimony whereof I have signed my name to this specification in the presence of two subscribing witnesses.

HARRY T. GOSS.

Witnesses:
J. WARES BRYCE,
EDWIN SEGER.